June 3, 1969 F. M. WANLASS 3,448,295

FOUR PHASE CLOCK CIRCUIT

Filed July 26, 1966

INVENTOR
FRANK M. WANLASS
BY James and Franklin
ATTORNEY 3,448,295

FOUR PHASE CLOCK CIRCUIT

Frank M. Wanlass, Huntington, N.Y., assignor to General Instrument Corporation, Newark, N.J., a corporation of Delaware Filed July 26, 1966, Ser. No. 567,954
Int. Cl. H03k 5/156
U.S. Cl. 307—260 20 Claims

ABSTRACT OF THE DISCLOSURE

A circuit having two input ports and four output ports interconnected so that two sequential inputs are converted into four sequential outputs, this being accomplished by connecting each input port directly to a respective one of a first pair of output ports, the input ports being operatively connected in opposite sense respectively to another pair of output ports, those operative connections being effective to produce appropriate signals at the output ports of said other pair.

Figure 1:
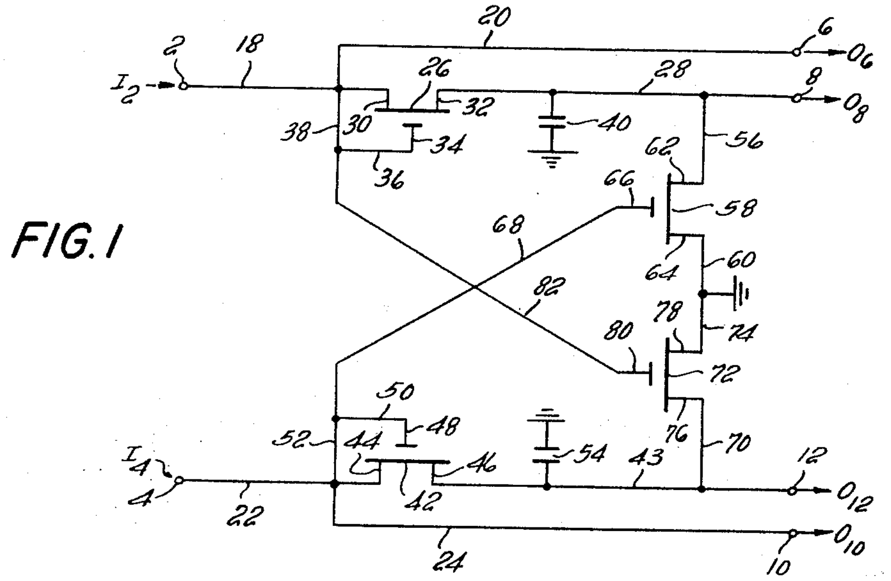

The present invention relates to circuitry for converting two sequential inputs into four sequential outputs.

Accurately timed clock signals are required for the operation of many different types of electronic logic circuitry. Circuits are known for providing such clock signals to desired degrees of timed accuracy and at desired high frequencies. In many applications a plurality of clock signals having predetermined phase relationships must be employed. While in such circumstances it is possible to utilize the required number of external electronic clock circuits and to produce the desired timed relationship therebetween, that approach to the problem is not only expensive but is also antithetical to the basic concept underlying the use of integrated circuitry.

There is, therefore, a great need for clock circuitry which can readily be incorporated into an integrated circuit assembly and which will require the use of a minimum number of external clocks. It is the prime object of the present invention to satisfy that need.

When two phase-related clock signals are required it has been known that one could employ only a single external clock circuit and utilize a conventional inverter circuit to produce the second clock signal in desired phase relation to the single externally supplied clock signal. This arrangement has been widely used in connection with integrated circuit shift registers where two sequentially acting clock signals are required for operation.

Improvements in shift register circuitry have involved the use of four clock signals. The circuitry of the present invention is especially designed to convert two appropriately phase-related clock signals into four appropriately phase-related clock signals, and to do so by means of circuitry which can be easily integrated with the logic circuitry upon which the clock signals act, all without requiring or producing any appreciable reduction in the operating frequency. The two clock signals which constitute the inputs to the circuitry of the present invention may be produced by two separate external clock circuits or, as indicated above, may be produced from a single external clock circuit which acts upon an inverter circuit incorporated into the logic assembly.

To the accomplishment of the above results, the circuitry of the present invention comprises first and second input ports and first, second, third and fourth output ports. The first and second input ports are directly operatively connected to the first and third output ports, so that the signal applied to the input ports will appear at those output ports. The first input port is also connected to the second output port by actuating means including an electronic switch which is closed on one phase of the input signal to the first input port and which is open on the other phase thereof. The second output port is also provided with means for retaining it at a given signal level and with deactuating means for causing the signal at the second output port to change to a level other than said given level, this latter deactuating means being actuated by the signal applied to the second input port. Similarly, the fourth output port is connected to the second input port by actuating means comprising an electronic switch of the type described, and its signal status is caused to change from said given level to said other level by deactuating means connected to the first input port. Thus, while the first and third output ports are connected directly and only to the first and second input ports respectively, the second and fourth output ports are connected to both the first and second input ports, but in different operative fashions, the operative connections being such as to cause the clock signals at the second and fourth output ports to vary in accordance with the clock input signals at both of the input ports, but in opposite senses respectively. The operative connections to the second and fourth output ports are of such a character as to be extremely rapid-acting. The result of this combination of direct and cross connection of input ports and output ports is to produce at the four output ports four clock signals which are sequential and which may accurately be produced at an exceptionally high repetitive rate of many hundreds of kilocycles per second.

The switching preferably is accomplished and controlled by electronic switch means of the transistor type, those switch means having output circuit terminals and a control terminal. It has been found particularly effective to use field effect transistors for this purpose. The output or main terminals of such devices are generally termed the source and drain respectively, and the control terminal of the device is generally termed the gate. A field effect device has the characteristic that a closed circuit is established between its output or main terminals when a suitable negative potential is applied to its gate or control electrode, an open circuit being estabilshed between its main terminals when its control terminal or gate is at ground potential. These devices function as switches of exceptionally high speed, the switch being closed when a negative potential is applied to the gate and the switch being open when the gate is at ground potential. Field effect transistor devices are very readily incorporated into integrated circuitry, thus further enhancing their utility in connection with the instant invention. It must be borne in mind, however, that field effect transistor devices are not the only types of electronic switch means which can be employed.

Figure 2:
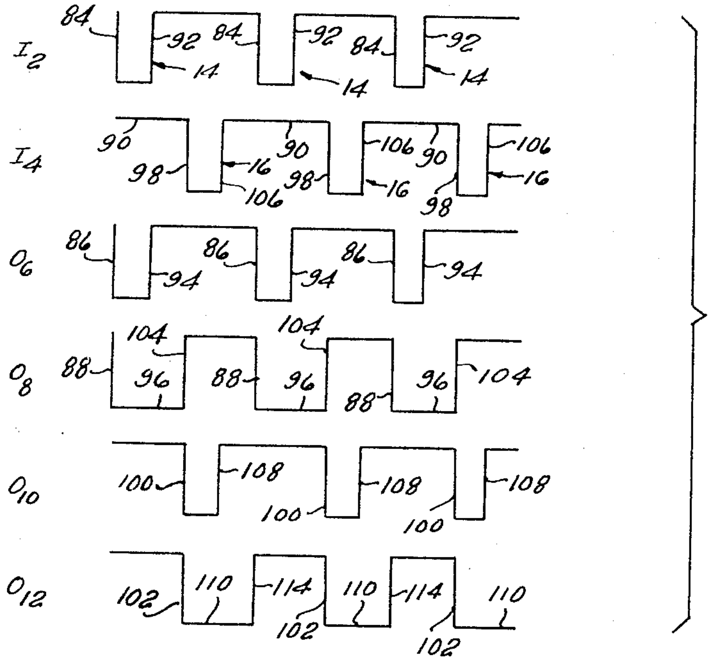

To the accomplishment of the above, and to such other objects as may hereinafter appear, the present invention relates to a circuit for converting two sequential inputs into four sequential outputs, as defined in the appended claims and as described in this specification, taken together with the accompanying drawings in which:

FIG. 1 is a circuit diagram of a preferred embodiment of the present invention; and FIG. 2 is a graphical representation of the timing relationships between the input and output signals involved.

The circuit comprises input ports 2 and 4 and output ports 6, 8, 10 and 12. Sequential input signals designated $I_2$ and $I_4$ are adapted to be applied to the input ports 2 and 4 respectively. Output signals $O_6$, $O_8$, $O_{10}$ and $O_{12}$ are designed to be produced at the output ports 6–12 respectively. Typical clock input signals $I_2$, $I_4$ are illustrated in the two upper rows of FIG. 2, which shows the various output and input signals in their time relationship, time being represented horizontally and signal amplitude being represented vertically. Each of the clock input signals $I_2$ and $I_4$ may be considered as normally at ground potential and as sequentially producing negative clock signal pulses, the pulses of clock input signal $I_2$ being generally designated 14 and the pulses of clock input signal $I_4$ being generally designated 16. It will be noted that the pulses 16 of the input signal $I_4$ occur between the pulses 14 of the clock signal $I_2$, so that the two signals $I_2$ and $I_4$ may be considered as being essentially 180° out of phase, each having the same high repetitive frequency, which may be on the order of several hundred kilocycles per second.

Leads 18 and 20 directly connect input port 2 to output port 6, and leads 22 and 24 directly connect input port 4 to output port 10. Thus the output signals $O_6$ and $O_{10}$ at the output ports 6 and 10 respectively, will correspond to the input signals $I_2$ and $I_4$ respectively at the input ports 2 and 4 respectively.

Input port 2 is connected to output port 8 by means of lead 18, electronic switch means 26 and lead 28. The electronic switch means 26, here shown as a field effect transistor device, has main electrodes 30 and 32 connected respectively to the leads 18 and 28 and has a control electrode 34 which is connected by leads 36 and 38 to the lead 18. A capacitor 40 is connected between lead 28 and ground, the term "ground" being used here to relate to any source of any reference potential. Similarly, the input port 4 is connected to the output port 12 by lead 22, electronic switch means 42 and lead 43, the electronic switch means 42 comprising a field effect transistor device having main electrodes 44 and 46 connected respectively to the leads 22 and 43 and having control electrode 48 connected by leads 50 and 52 to the lead 22, and a capacitor 54 is connected between the lead 43 and ground.

The lead 28 connected to the output port 8 is also connected to ground by means of lead 56, electronic switch means 58 and lead 60, the electronic switch means 58 comprising a field effect transistor device having main electrodes 62 and 64 connected to the leads 56 and 60 respectively and having a control electrode 66 connected by leads 68, 52 and 22 to the input port 4. Similarly the lead 43 connected to the output port 12 is connected to ground by lead 70, electronic switch means 72 and lead 74, the switching means 72 comprising a field electrode transistor device having main electrodes 76 and 78 connected respectively to the leads 70 and 74 and having a control electrode 80 connected by leads 82, 38 and 18 to the input port 2.

The operation of the circuit is as follows: When the clock input signal $I_2$ goes negative, as indicated by line 84 (references to "lines" throughout this discussion relate to the graphical representation in FIG. 2), the output signal $O_6$ will also go negative, as indicated by the line 86, because of the direct connection between the ports. When the input signal $I_2$ goes negative, the control electrode 34 of the field effect device 26 becomes negative, that field effect device 26 becomes conductive (the switch defined thereby closes), and consequently the output signal $O_8$ at the output port 8 goes negative, as indicated by the line 88. The capacitor 40 will be appropriately negatively charged. During this time the input signal $I_4$ is at ground potential, as indicated by the line 90, the control electrode 66 of the field effect switching transistor 58 is at ground potential, and that device is rendered nonconductive between its main terminals 62 and 64 (the switch is open). Hence the capacitor 40 remains charged.

Next the input signal $I_2$ returns to ground potential, as indicated by the line 92. Because of the direct connection between the ports 2 and 6, the output signal $O_6$ acts similarly, as indicated by the line 94. Return of the signal $I_2$ to ground potential causes the control electrode 34 of the field effect device 26 to return to ground, thus rendering that device non-conductive between its main electrodes 30 and 32 (the switch opens). However, because the capacitor 40 has become appropriately charged, and because the switching transistor 58 remains nonconductive (the input signal $I_4$ is still at ground potential), the signal $O_8$ remains negative, as indicated by the line 96.

Next the input signal $I_4$ goes negative, as indicated by the line 98. At this point several things happen substantially simultaneously. The signal $O_{10}$ at the output port 10 directly connected to the input port 4 goes negative, as indicated by the line 100. The control electrode 48 of the switching transistor 42 becomes conductive, and hence the output signal $O_{12}$ goes negative, as indicated by the line 102, and the capacitor 54 charges appropriately. Since at this time the input signal $I_2$ is at ground potential, the control electrode 80 of the switching transistor 72 is at ground potential, that switching transistor 72 is nonconductive between its main electrodes 76 and 78, and the charge remains on the capacitor 54 and hence at the output port 12. In addition, the control electrode 66 of the switching transistor 58 becomes negative, that transistor becomes conductive between its main electrodes 62 and 64, and the capacitor 40 discharges through the conductive path thus provided; hence the output signal $O_8$ returns to ground potential, as indicated by the line 104.

Next the input signal $I_4$ returns to ground potential, as indicated by the line 106. The output signal $O_{10}$ will correspondingly shift, as indicated by the line 108, since it is directly connected to the input port 4. The switching transistor 42 will become nonconductive, since its control electrode 48 will be at the ground potential, but the output signal $O_{12}$ will remain negative, as indicated by the line 110, because the input signal $I_2$ is still at ground potential, the control electrode 80 of the switching transistor 72 is correspondingly at ground potential, the switching transistor 72 remains nonconductive between its main electrodes 76 and 78, and no discharge path for the charge on the capacitor 54 is provided.

Next, constituting the end of one cycle and the beginning of a new one, the input signal $I_2$ again goes negative, as indicated by the line 84. In addition to causing the output signals $O_6$ and $O_8$ to go negative as indicated by the lines 86 and 88, as explained above, this also makes negative the control electrode 80 of the switching transistor 72, rendering that transistor conductive between its main electrodes 76 and 78 and thus providing a discharge path for the charge on the capacitor 54. As a result the output signal $O_{12}$ returns to ground potential, as indicated by the line 114.

Hence, as will clearly be apparent from FIG. 2, two sequential input signals $I_2$ and $I_4$ have been converted into four sequential output signals $O_6$, $O_8$, $O_{10}$ and $O_{12}$, with the positive-acting portions 94, 104, 108 and 114 of those signals occuring sequentially in appropriate timed relation with one another. The input signals $I_2$ and $I_4$ are negative alternatively; correspondingly the pairs of output signals $O_6$, $O_8$ and $O_{10}$, $O_{12}$ are negative alternatively. The signals of each such pair go negative together but they go positive at different times.

These results have been achieved by a simple circuit involving the use of extremely fast-acting devices which can readily be incorporated into integrated circuitry, which have a rate of response no less than the rate of response of the devices used in the logic circuitry adapted to be associated therewith, and which therefore permit the incorporation of the multiple-clock-producing circuitry into an integrated circuit assembly without any degradation in the operating frequency involved. As a result multi-clock-signal systems may be readily manufactured for use in conjunction with only a single externally supplied clock signal.

While but a single embodiment of the present invention has been here specifically disclosed it will be apparent that many variations may be made therein, all within the scope of the invention as defined in the following claims.

I claim:

1. A clock circuit for converting two sequential inputs into four sequential outputs, said circuit comprising first and second input ports to which multiphase input signals having first and second phases are adapted to be connected and first, second, third and fourth output ports at which multiphase output signals are adapted to be produced, direct operative connection means between said first and second input ports and said first and third output ports respectively, an actuating means connected between said first input port and said second output port, an actuating means connected between said second input port and said fourth output port, said actuating means being effective to cause the signals at their respective output ports to assume a given phase condition on a first phase of their respective input signals, a deactuating means connected between said first input port and said fourth output port, and a deactuating means connected between said second input port and said second output port, said deactuating means being effective to cause the signals at their respective output ports to assume a phase condition other than said given phase condition on a first phase of their respective input signals.

2. The clock circuit of claim 1, in which said actuating means are effective to operatively connect their respective input and output ports on said first phase of their respective input signals, thereby to cause the phase of their output signals to correspond to that of their respective input signals.

3. The clock circuit of claim 2, in which said actuating means are effective to operatively disconnect their respective input and output ports on said second phase of their respective input signals.

4. The clock circuit of claim 2, in which said deactuating means are effective to connect their respective output ports to a reference source on said first phase of their respective input signals.

5. The clock circuit of claim 2, in which said deactuating means are effective to connect their respective output ports to a reference source on said first phase of their respective input signals and are effective to cause the signals at their respective output ports to remain in their otherwise existing phase status on the second phase of their respective input signals.

6. The clock circuit of claim 2, in which said actuating means are effective to operatively disconnect their respective input and output ports on said second phase of their respective input signals, and in which said deactuating means are effective to connect their respective output ports to a reference source on said first phase of their respective input signals.

7. The clock circuit of claim 2, in which said actuating means are effective to operatively disconnect their respective input and output ports on said second phase of their respective input signals, and in which said deactuating means are effective to connect their respective output ports to a reference source on said first phase of their respective input signals and are effective to cause the signals at their respective output ports to remain in their otherwise existing phase status on the second phase of their respective input signals.

8. The clock circuit of claim 2, in which said deactuating means comprises chargeable means connected to the corresponding output port and effective to maintain the signal at said port in its otherwise existing phase status, and voltage-sensitive discharging means operatively connected to said chargeable means and to the corresponding input port and effective to discharge said chargeable means when said input signal is in its said first phase.

9. The clock circuit of claim 2, in which said actuating means are effective to operatively disconnect their respective input and output ports on said second phase of their respective input signals, and in which said deactuating means comprises chargeable means connected to the corresponding output port and effective to maintain the signal at said port in its otherwise existing phase status, and voltage-sensitive discharging means operatively connected to said chargeable means and to the corresponding input port and effective to discharge said chargeable means when said input signal is in its said first phase.

10. The clock circuit of claim 1, in which said actuating means comprise voltage-sensitive electronic switch means having main terminals and a control terminal, said main terminals being connected to the corresponding input and output ports respectively and said control terminal being connected to said corresponding input port.

11. The clock circuit of claim 10, in which said deactuating means are effective to connect their respective output ports to a reference source on said first phase of their respective input signals.

12. The clock circuit of claim 10, in which said deactuating means are effective to connect their respective output ports to a reference source on said first phase of their respective input signals and are effective to cause the signals at their respective output ports to remain in their otherwise existing phase status on the second phase of their respective input signals.

13. The clock circuit of claim 10, in which said deactuating means comprises chargeable means connected to the corresponding output port and effective to maintain the signal at said port in its otherwise existing phase status, and voltage-sensitive discharging means operatively connected to said chargeable means and to the corresponding input port and effective to discharge said chargeable means when said input signal is in its said first phase.

14. The clock circuit of claim 2, in which said deactuating means comprises chargeable means connected to the corresponding output port and effective to maintain the signal to said port in its otherwise existing phase status, and voltage-sensitive discharging means operatively connected to said chargeable means and to the corresponding input port and effective to discharge said chargeable means when said input signal is in its said first phase, said voltage-sensitive discharging means comprising voltage-sensitive electronic switch means having main terminals and a control terminal, said main terminals being connected to said chargeable means and to a reference source respectively and said control terminal being connected to the corresponding input port.

15. The clock circuit of claim 2, in which said actuating means are effective to operatively disconnect their respective input and output ports on said second phase of their respective input signals, in which said deactuating means comprises chargeable means connected to the corresponding output port and effective to maintain the signal to said port in its otherwise existing phase status, and voltage-sensitive discharging means operatively connected to said chargeable means and to the corresponding input port and effective to discharge said chargeable means when said input signal is in its said first phase, said voltage-sensitive discharging means comprising voltage-sensitive electronic switch means having main terminals and a control terminal, said main terminal being connected to said chargeable means and to a reference source respectively and said control terminal being connected to the corresponding input port.

16. The clock circuit of claim 10, in which said deactuating means are effective to connect their respective output ports to a reference source on said first phase of their respective input signal.

17. The clock circuit of claim 16, in which said deactuating means are effective to cause the signals at their respective output ports to remain in their otherwise existing phase status on the second phase of their respective input signals.

18. The clock circuit of claim 1, in which said deactuating means comprises chargeable means connected to the corresponding output port and effective to maintain the signal at said port in its otherwise existing phase status, and voltage-sensitive discharging means operatively connected to said chargeable means and to the corresponding input port and effective to discharge said charging means when said input is in its said first phase.

19. The clock circuit of claim 18, voltage-sensitive discharging means comprising voltage-sensitive electronic switch means having main terminals and a control terminal, said main terminals being connected to said chargeable means and to a reference source respectively and said control terminal being connected to the corresponding input port.

20. A clock circuit for converting two sequential inputs into four sequential outputs, said circuit comprising first and second input ports and first, second, third and fourth output ports, a direct connection between said first input port and said first output port, a connection between said first input port and said second output port comprising an electronic switch having a pair of main electrodes connected to said first input and second output ports respectively and a control electrode connected to said first input port, a first capacitor connected between said second output port and a reference source, a direct connection between said second input port and said third output port, a connection between said second input port and said fourth output port comprising an electronic switch having a pair of main electrodes connected to said second input and fourth output ports respectively and a control electrode connected to said second input port, a second capacitor connected between said fourth output port and a reference source, and a pair of electronic switches each having a pair of main electrodes and a control electrode, one of said switches having its main electrodes connected between said second output port and a reference source and its control electrode connected to said second input port, the other of said switches having its main electrodes connected between said fourth output port and a reference source and its control electrode connected to said first input port.

References Cited

UNITED STATES PATENTS 3,074,639 1/1963 Morgan et al. ---- 307—216 XR

ARTHUR GAUSS, *Primary Examiner.*

JOHN ZAZWORSKY, *Assistant Examiner.*

U.S. Cl. X.R.

307—251, 262, 304; 328—62, 67